(12) United States Patent
Wang (10) Patent No.: US 6,621,696 B1
(45) Date of Patent: Sep. 16, 2003

(54) NON-SCREWED FASTENING DEVICE (75) Inventor: Chih-Chong Wang, Taipei (TW)

(73) Assignee: Quanta Computer, Inc., Taipei (TW)

( * ) Notice: Subject to any disclaimer, the term of this patent is extended or adjusted under 35 U.S.C. 154(b) by 23 days.

(21) Appl. No.: 10/094,169

(22) Filed: Mar. 7, 2002

(51) Int. Cl.⁷ .................................................. G06F 1/16
(52) U.S. Cl. ..................... 361/685; 361/679; 312/223.3; 248/535
(58) Field of Search .................................. 361/685–687, 361/679–684, 724–727; 312/223.1–223.6; 248/27.1, 27.3, 535; 439/64–65

(56) References Cited

U.S. PATENT DOCUMENTS

| | | | | |
|---|---|---|---|---|
| 6,388,875 B1 | * | 5/2002 | Chen | 361/685 |
| 6,396,686 B1 | * | 5/2002 | Liu et al. | 361/685 |
| 6,442,031 B1 | * | 8/2002 | Liu | 361/727 |

* cited by examiner

*Primary Examiner*—Darren Schuberg
*Assistant Examiner*—Hung Van Duong
(74) *Attorney, Agent, or Firm*—Perkins Coie LLP (57) ABSTRACT

A non-screwed fastening device has a retaining ring and a shaft lever. The retaining ring has a first annular edge, an inner ring flange and a second annular edge. The first annular edge has a plurality of slits to make the retaining ring resilient and at least a groove located in the inner surface of the retaining ring. The inner ring flange is disposed in the surface region of the retaining ring for buckling the retaining ring and the shaft lever, and the second annular edge further has a recess region. The shaft lever has a first circular flute, a second circular flute, a first end portion and a second end portion. The first circular flute and the second circular flute are selectively buckled to the inner ring flange by the retaining ring resilience. One side region of the shaft lever having at least a lug is placed into the retaining ring along the groove and the first end portion is put into the locating hole of the peripheral device such that the lug is locked to the recess region for fastening.

20 Claims, 8 Drawing Sheets

NON-SCREWED FASTENING DEVICE

FIELD OF THE INVENTION

The present invention generally relates to a fastening device, and more particularly, to a non-screwed fastening device for a peripheral device of a computer system.

BACKGROUND OF THE INVENTION

Due to the rapid development of information technology, computer peripheral devices have become increasingly widespread. For example, hard disk drives (HDD), floppy disk drives (FDD) and compact disk read only memories (CD-ROM) are almost always the standard equipment within computers. As more and more devices are placed in the computer system, the complexity of physically installing and removing these peripheral devices is obviously increased. In particular, screws act as fastening devices for securing a peripheral device, but tool kits, e.g. screwdrivers, are needed to attach the peripheral device into the computer by these screws. Also, a large amount of screws is used in the set-up process of the peripheral device, resulting in inefficiency of installation and removal.

Figure 1:
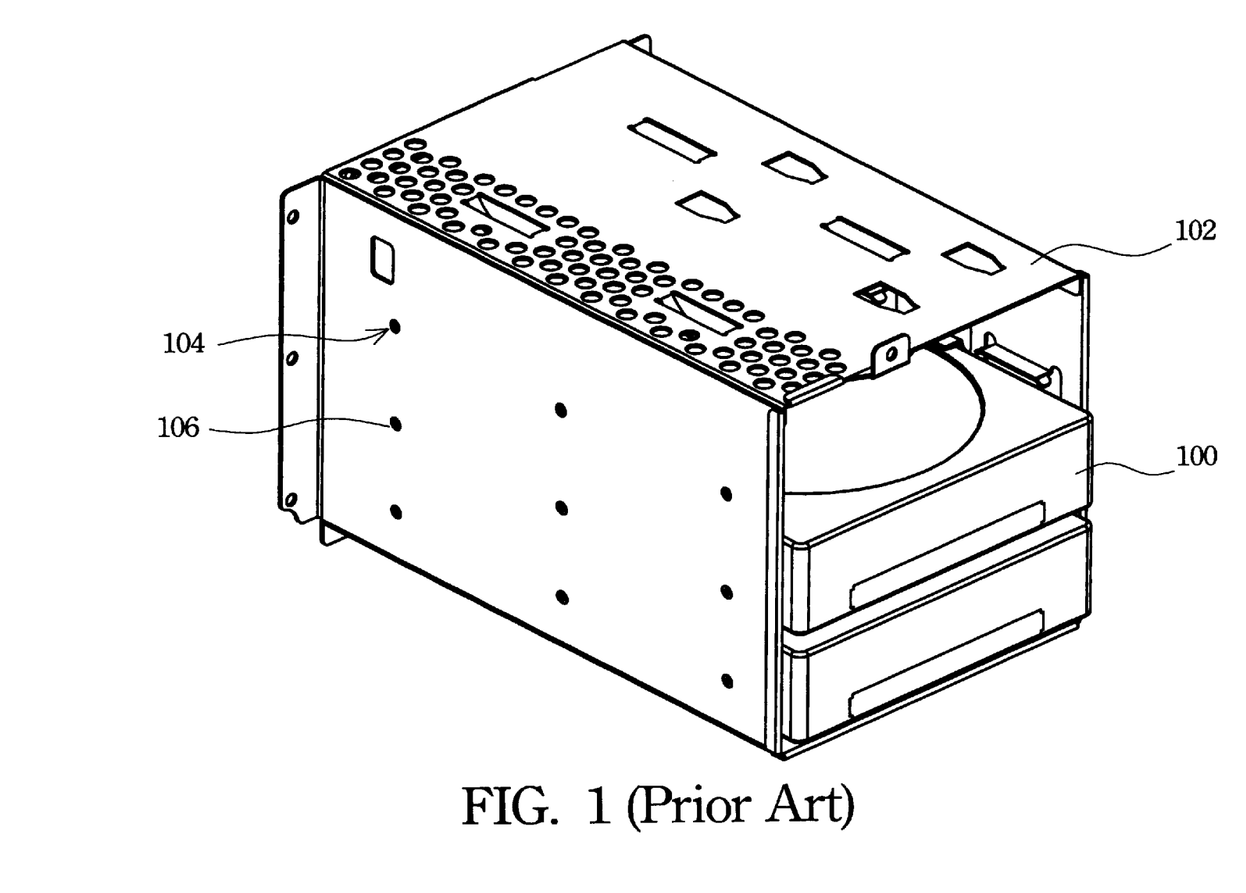
FIG. 1 illustrates a HDD fixed to the frame case by screws according to the prior art.

Referring to FIG. 1, this figure shows a HDD 100 fixed to a frame case 102 by screws according to the prior art. The HDD 100 is placed into the frame case 102 wherein the locating hole of the HDD 100 aligns with the opening of the frame case 102. Thereafter, a screwdriver is used to drive the screws 106 into locating holes 104 to fasten the HDD 100 to the frame case 102. According to another prior art technique, the HDD 100 is secured to the frame case 102 and then the frame case 102 is put into main body of the computer system. Afterwards, the frame case 102 is attached to the main body via a sliding fastener, but this also uses a lot of screws 106.

Consequently, when the screws 106 are used as fastening devices to install the HDD 100 according to prior art, not only auxiliary tools must be used to secure the HDD 100 to the frame case 102, but inconvenience in the maintenance process will be increased severely, as well. Installation and removal of the HDD 100 is thus inefficient.

SUMMARY OF THE INVENTION

The primary object of the present invention is to utilize a non-screwed fastening device for securing peripheral devices to a frame case such that the use of auxiliary tools in the loading and unloading screw process is not needed.

Another object of the present invention is to utilize a non-screwed fastening device to replace the screws with the non-screwed fastening device and to reduce the large amount of screws so that the installment and maintenance efficiency of the peripheral devices are greatly increased.

According to the above objects, the present invention sets forth a non-screwed fastening device for computer peripheral devices. The non-screwed fastening device essentially comprises a retaining ring and a shaft lever wherein the retaining ring, a cylindrical shape coupled to a carrier base, has a first annular edge, an inner ring flange and a second annular edge. The retaining ring includes a first annular edge, an inner ring flange and a second annular edge. The retaining ring also includes a plurality of slits dividing the retaining ring into a plurality of resilient portions arranged in an axial line of the retaining ring to make the retaining ring resilient. Also, the first annular edge essentially comprises a bevel for readily placing the shaft lever into the retaining ring.

At least a groove, preferably connected to any one of slits, is located in the inner surface of the retaining ring along an axial line thereof. In other words, these slits extend from the first annular edge to one end of the groove along the inner surface of the retaining ring. Alternatively, the groove also extends from the first annular edge to the second annular edge via the inner surface of the retaining ring.

The inner ring flange is disposed in the surface region of the retaining ring for buckling the retaining ring and the shaft lever. The second annular edge is buckled to one end portion of the carrier base and the second annular edge further contains a recess region for matching the structure of the shaft lever whereby the non-screwed fastening device can effectively lock the peripheral device in place.

The shaft lever, similar to a column in shape, having a irregular surface and coupled to the retaining ring, has a first circular flute, a second circular flute, a first end portion and a second end portion. The first circular flute located in the region of the shaft lever near the first end portion is buckled to the inner ring flange by the resilience of the retaining ring. The second circular flute located in the region of the shaft lever near the second end portion is selectively buckled to the inner ring flange. Additionally, there is a displacement range between the first circular flute and the second circular flute for moving the first end portion into the locating hole back and forth to secure the peripheral device.

The size of the first end portion corresponds to the standard specifications of the screws. The geometric shape of the first end portion is circular, rectangular or whatever shape correctly matches the locating hole of peripheral device. The second end portion further comprises a flange to handle the shaft lever. In the preferred embodiment of the present invention, the first end portion preferably allows a shaft part to be embedded into one end of the shaft lever. Alternatively, a continuous structure is made up of the first end portion and the shaft lever together. One side region of the shaft lever further has at least a lug to be placed into the retaining ring along the groove by turning the shaft lever so that the lug is rapidly locked to the recess region.

In summary, the present invention of the non-screwed fastening device is applied to peripheral devices inside a computer system. During the set-up process of the peripheral devices, no auxiliary tools are needed to load and unload these peripheral devices into or from the frame case. Besides making the maintenance procedure easier, the non-screwed fastening device can effectively reduce the use of screws with respect to peripheral devices, thus avoiding leaving screws within the frame case where they might cause a short circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a non-screwed fastening device to improve the shortcomings of the prior art. In the set-up process of peripheral devices, no auxiliary tools, such as screwdrivers, are needed to install and remove these peripheral devices from the frame case. As a result, these peripheral devices can be rapidly and firmly secured to a frame case by the present invention.

Figure 2A:
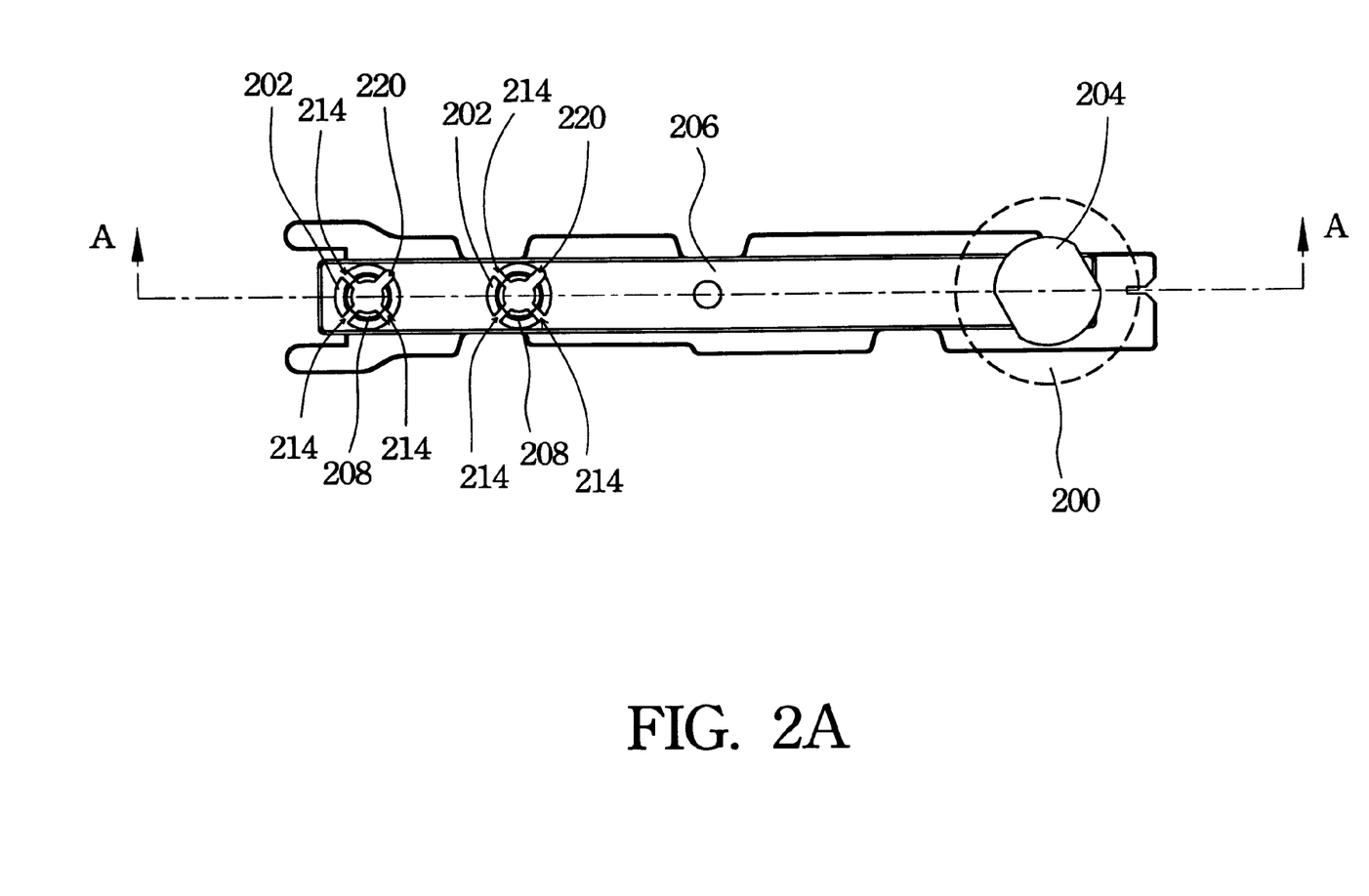
FIG. 2A illustrates a top view of a non-screwed fastening device according to the present invention.
Figure 2B:
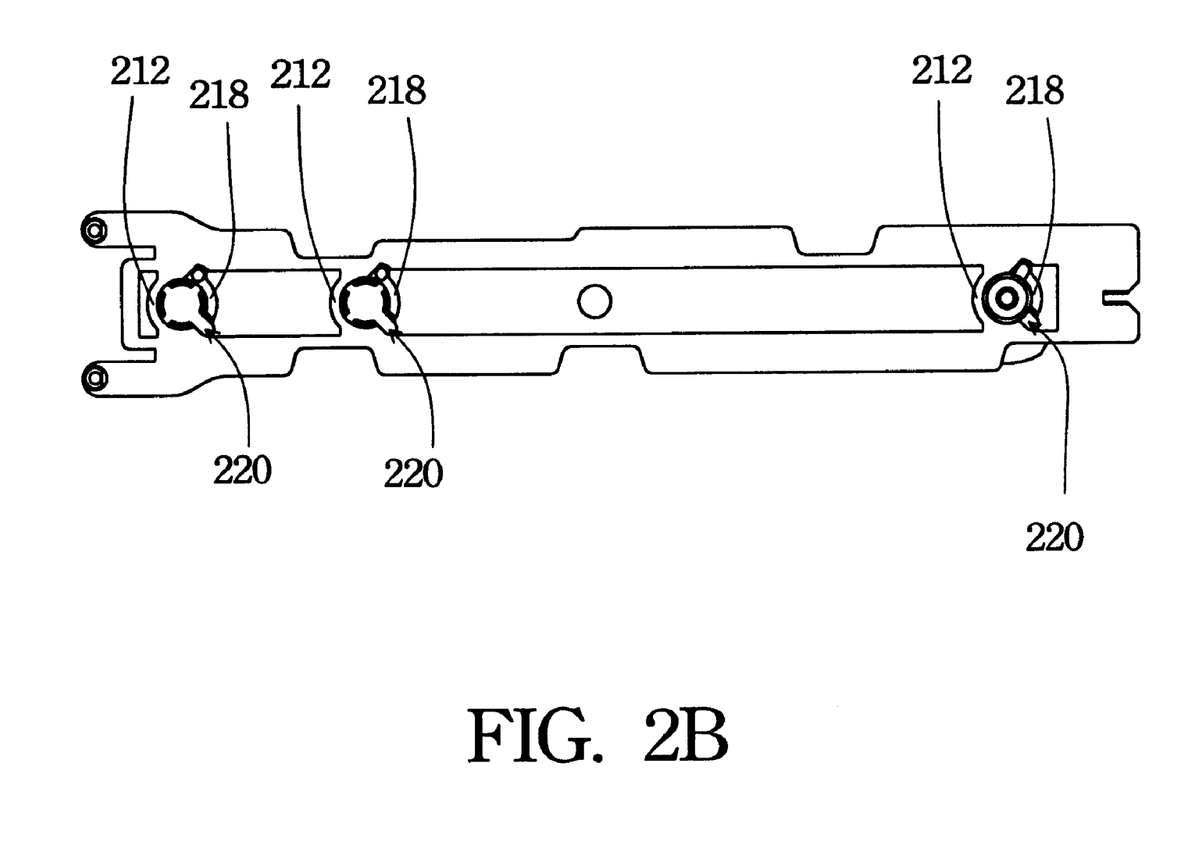
FIG. 2B illustrates a bottom view of FIG. 2A according to the present invention.
Figure 2C:
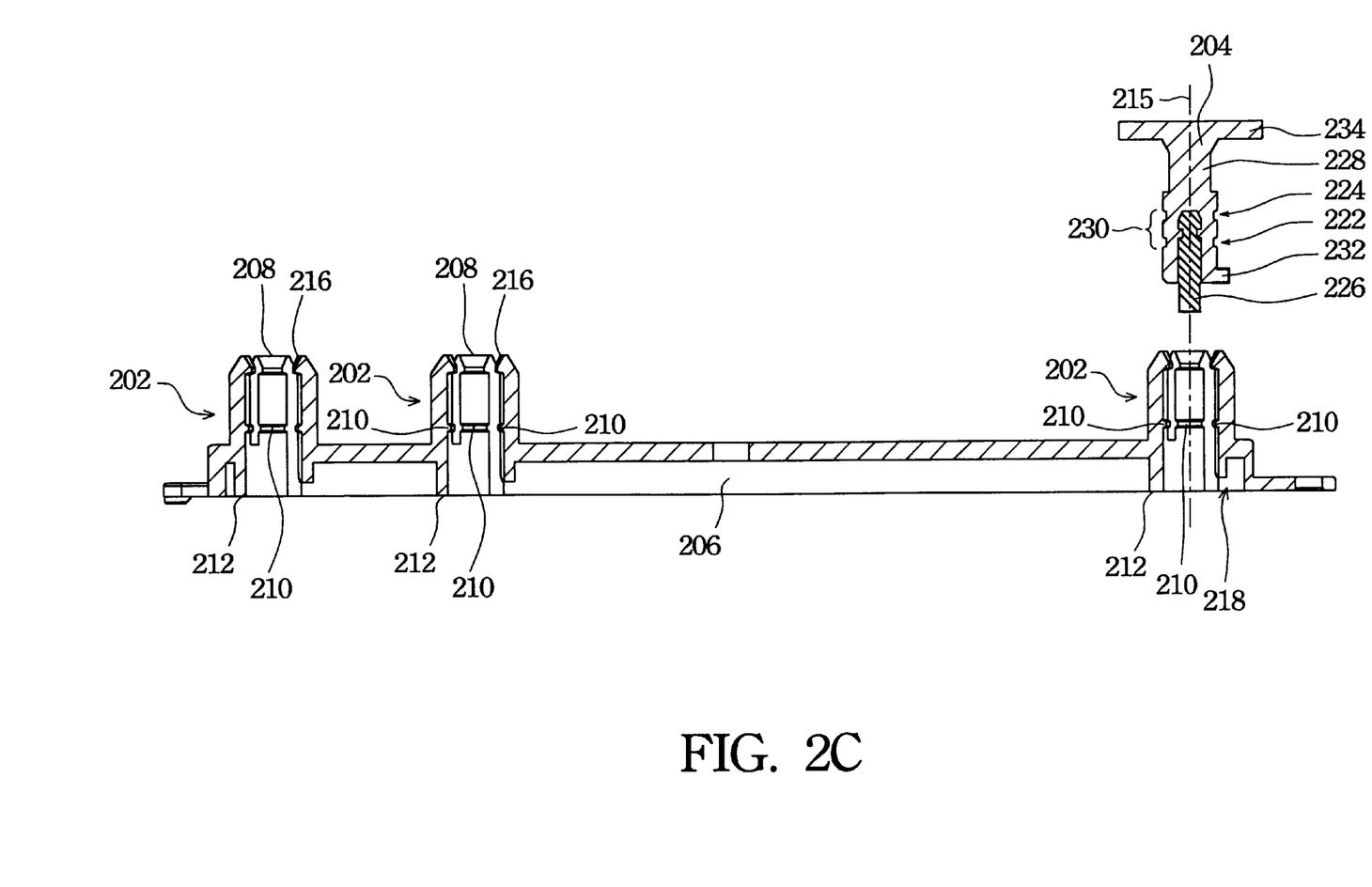
FIG. 2C illustrates a cross-sectional view of FIG. 2A along line A—A according to the present invention.

Referring to FIGS. 2A–2C, a top view of a non-screwed fastening device is shown in FIG. 2A, a bottom view of FIG. 2A is shown in FIG. 2B, and a cross-sectional view of FIG. 2A along line A—A according is shown in FIG. 2C according to the present invention.

The non-screwed fastening device 200 essentially comprises a retaining ring 202 and a shaft lever 204. The retaining ring 202 is cylindrical in shape and preferably is a plurality of retaining rings 202 coupled to a carrier base 206 for fastening peripheral devices. The retaining ring 202 includes a first annular edge 208, an inner ring flange 210 (shown in FIG. 2C) and a second annular edge 212 (shown in FIG. 2B). The retaining ring 202 also includes a plurality of slits 214 dividing the retaining ring 202 into a plurality of resilient portions, preferably four portions, arranged in an axial line 215 (shown in FIG. 2C) of the retaining ring 202 to make the retaining ring 202 resilient. Also, the first annular edge 208 essentially comprises a bevel for readily placing the shaft lever 204 into the retaining ring 202.

At least a groove 220, preferably connected to any one of slits 214, is located in the inner surface of the retaining ring 202 along the axial line 215 thereof. In other words, these slits 214 extend from the first annular edge 208 to one end of the groove 220 along the inner surface of the retaining ring 202. Alternatively, the groove 220 also extends from the first annular edge 208 to the second annular edge 212 via the inner surface of the retaining ring 202.

The inner ring flange 210 is disposed in the surface region of the retaining ring 202 for buckling the retaining ring 202 and the shaft lever 204. The second annular edge 212 is buckled to one end portion of the carrier base 206 and the second annular edge 212 further contains a recess region 218 for matching the structure of the shaft lever 204 whereby the non-screwed fastening device 200 can effectively lock the peripheral device in place.

Referring to FIG. 2C, the shaft lever 204, similar in shape to a column, having a irregular surface and coupled to the retaining ring 202, has a first circular flute 222, a second circular flute 224, a first end portion 226 and a second end portion 228. The first circular flute 222 located in the region of the shaft lever 204 near the first end portion 226 is buckled to the inner ring flange 210 by the resilience of the retaining ring 202. The second circular flute 224 located in the region of the shaft lever 204 near the second end portion 228 is selectively buckled to the inner ring flange 210. Additionally, there is a displacement range 230 between the first circular flute 222 and the second circular flute 224 for moving the first end portion 226 into the locating hole back and forth to secure the peripheral device.

The size of the first end portion 226 corresponds to standard specifications of the screws. The geometric shape of the first end portion 226 is circular, rectangular or whatever shape correctly matches the locating hole of peripheral device. The second end portion 228 further comprises a flange 234 to handle the shaft lever 204. In the preferred embodiment of the present invention, the first end portion 226 preferably allows a shaft part to be embedded into one end of the shaft lever 204. Alternatively, a continuous structure is made up of the first end portion 226 and the shaft lever 204 together. One side region of the shaft lever 204 further has at least a lug 232 to be placed into the retaining ring 202 along the groove 220 by turning the shaft lever 204 so that the lug 232 is rapidly locked to the recess region 218.

Figure 3A:
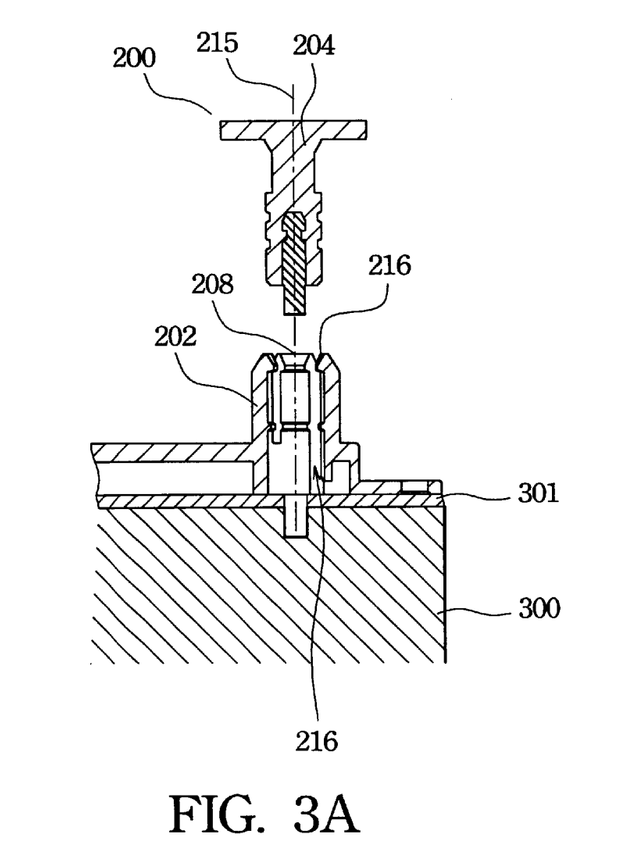
FIGS. 3A–3D illustrate a local cross-sectional view of the non-screwed fastening device having an assembly status according to the present invention.

Referring to FIGS. 3A–3D, a local cross-sectional view of the non-screwed fastening device 200 having an assembly status is shown according to the present invention. In FIG. 3A, the retaining ring 202 and the shaft lever 204 are not combined together and the peripheral device 300 and the frame case are not yet attached to each other. While the retaining ring 202 forwardly contacts with the shaft lever 204, the first annular edge 208 of the retaining ring 202 expands outwardly to put the shaft lever 204 into the retaining ring 202 wherein the resilience of retaining ring 202 and the bevel of first annular edge 208 serves as an leading effect.

Figure 3B:
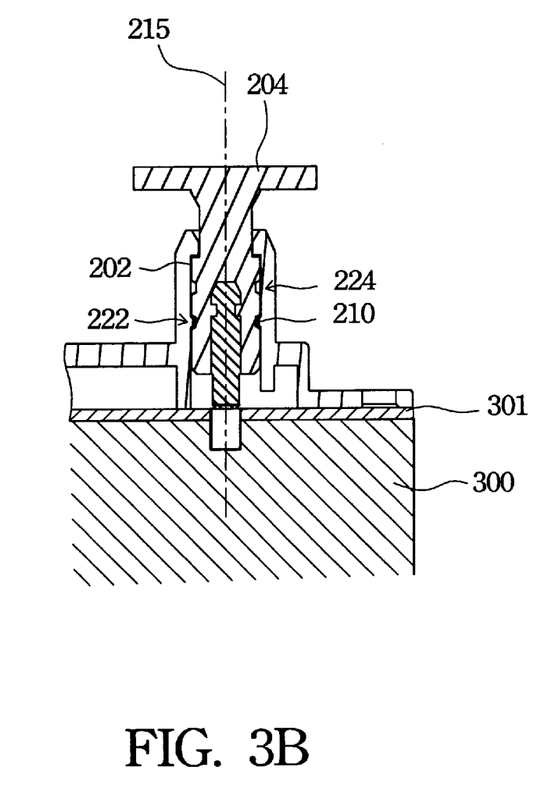

In FIG. 3B, the peripheral device 300 and the frame case are still separate, and the retaining ring 202 and the shaft lever 204 are defined as having a first buckling status. Specifically, the circular flute of retaining ring 202 is cor-relatively fastened to the first circular flute 222 of the shaft lever 204. The first end portion 226 of shaft lever 204 lies in the second annular edge 212 of retaining ring 202, but there is still a separation status between the peripheral device 300 and the non-screwed fastening device 200 connected to the frame case.

Figure 3C:
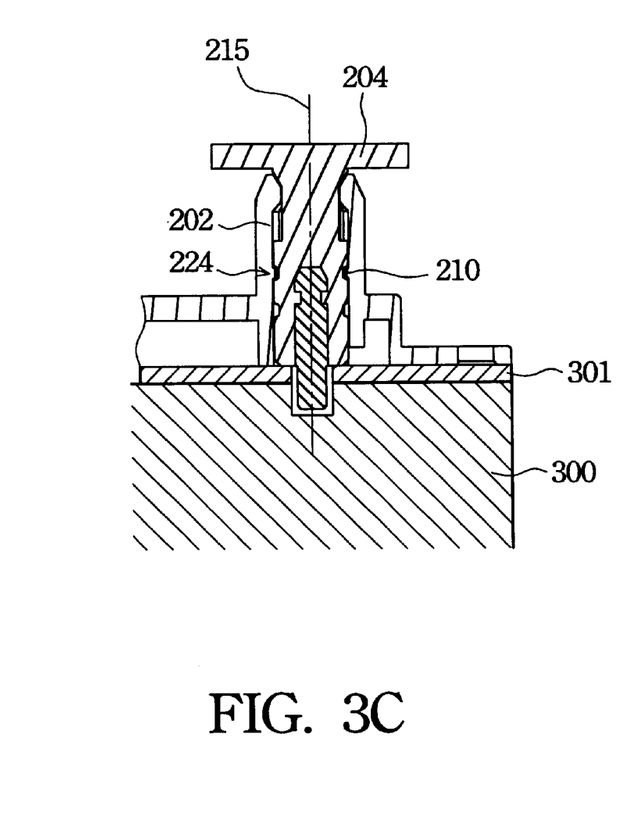

In FIG. 3C, the peripheral device 300 and the frame case are connected by using non-screwed fastening device 200, and the retaining ring 202 and the shaft lever 204 are defined as having a second buckling status. In other words, while the shaft lever 204 moves toward the axis direction of the retaining ring 202, the retaining ring 202 expands outwardly due to the resilience induced from the slits 214 so that the retaining ring 202 and the shaft lever 204 together generate a second buckling status. Simultaneously, the first end portion 226 of shaft lever 204 is exactly pushed into the locating hole of peripheral device 300.

Figure 3D:
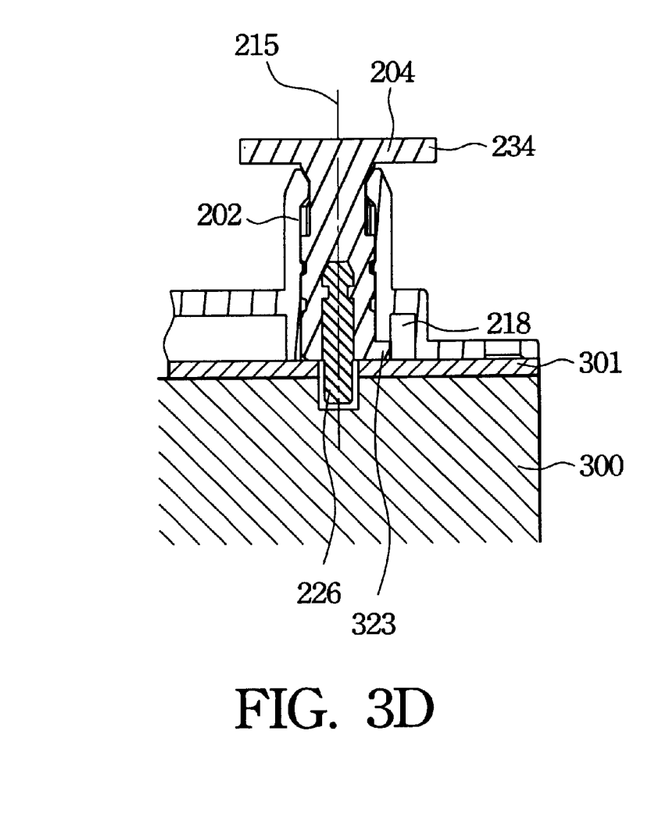

In FIG. 3D, the peripheral device 300 and the frame case are combined together with the non-screwed fastening device 200, and the retaining ring 202 and the shaft lever 204 are fastened and locked together. When the first end portion 226 of shaft lever 204 passes through the frame case to be put into the locating hole of the peripheral device 300, the recess region 218 of the retaining ring 202 receives the lug 232 adjacent to the first end portion 226 of the shaft lever 204 by holding and turning the flange 234 of shaft lever 204.

Figure 4A:
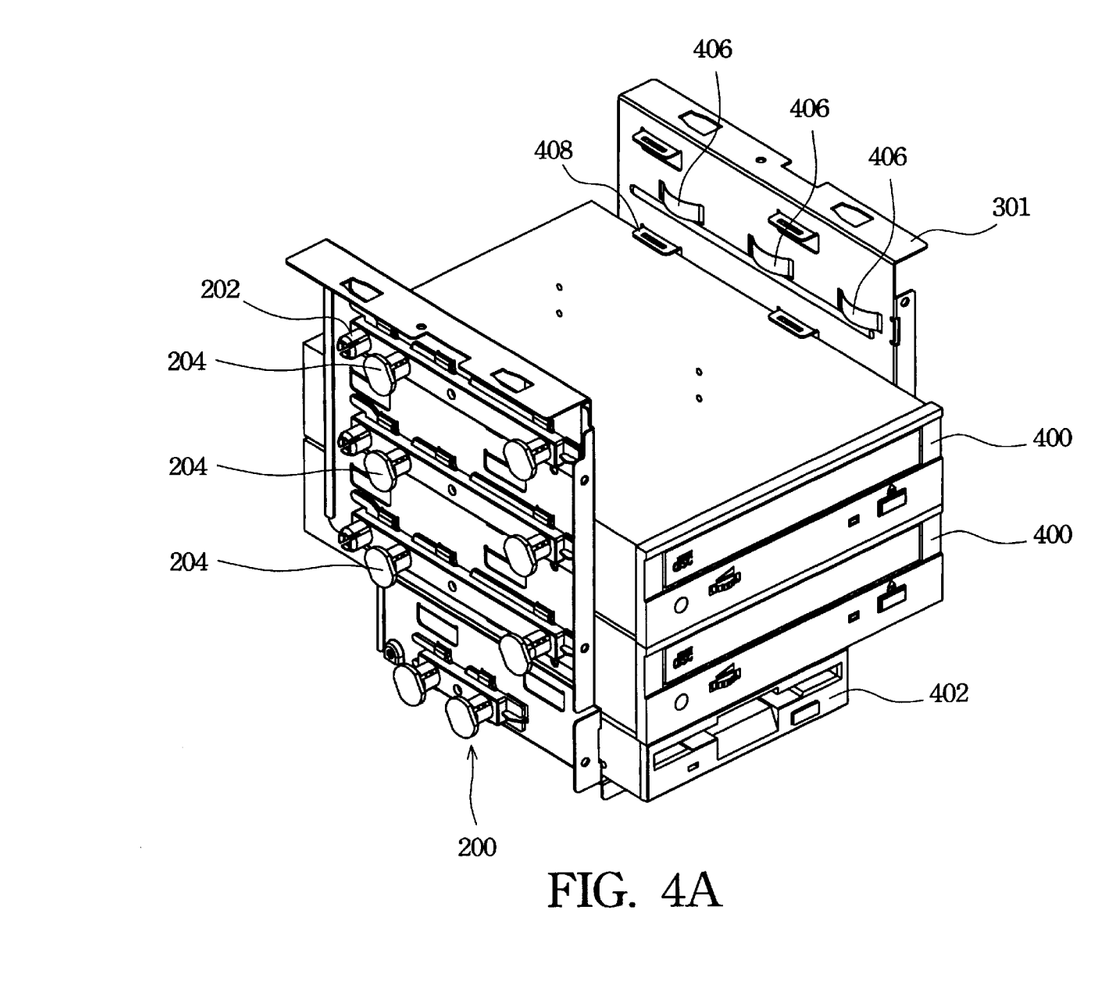
FIG. 4A illustrates one preferred embodiment of securing the CD-ROM and the FDD to the frame case by using the non-screwed fastening device according to the present invention.

Referring to FIG. 4A, one preferred embodiment of securing the CD-ROM 400 and the FDD 402 to the frame case by using the non-screwed fastening device 200 is shown according to the present invention. A non-screwed fastening device 200 is located in one side of the frame case and a plurality of resilient device 406 is disposed in the other side. Further, the frame case includes a plurality of L-shaped bending members 408. The elements of the non-screwed fastening device 200 and functions thereof are described as the above. The resilient devices 406 are able to eliminate the assembly space between CD-ROM 400, FDD 402 and the frame case respectively to make a close combination and to cancel vibration effect among CD-ROM 400, FDD 402 and the frame case. Additionally, the L-shaped bending member 408 is used for vertical positioning.

For an example of CD-ROM 400 assembly to the frame case, the CD-ROM 400 is placed in the frame case. Thereafter, the shaft lever 204 is pushed into the retaining ring 202 and thus the first end portion 226 of the shaft lever 204 is inserted into the locating hole so that the CD-ROM 400 is locked to the frame case by the non-screwed fastening device 200 after the shaft lever 204 is turned. In other words, when the shaft lever 204 and the CD-ROM 400 are combined, the shaft lever 204 sustains an axial force and a radial force against the locating hole of the peripheral device 300. Therefore, the CD-ROM 400 is completely fixed via the non-screwed fastening device 200 and the L-shaped bending member 408 of the frame case.

Figure 4B:
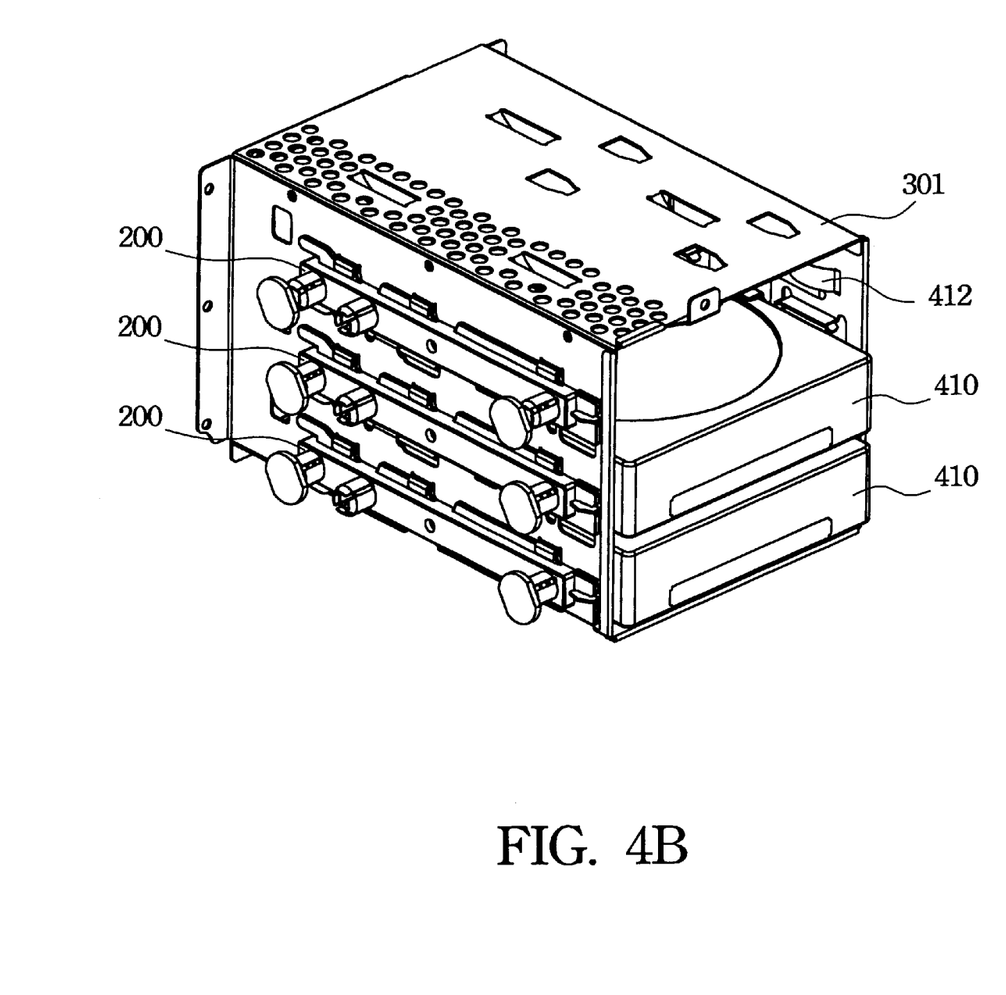
FIG. 4B illustrates a second preferred embodiment of securing the HDD to the frame case by using the non-screwed fastening device according to the present invention.

Alternatively, the FDD 402 also can be secured in the foregoing way. Furthermore, FIG. 4B shows the other preferred embodiment of securing a HDD 410 to the frame case by using the non-screwed fastening device 200 according to the present invention. The non-screwed fastening device 200 and a plurality of resilient devices 406 are applied to attach the HDD 410 into the frame case. Consequently, the non-screwed fastening device 200 is not only used for the peripheral device 300 of the computer system, but also for digital versatile disc (DVD) and the other devices related to non-computer products.

According to the above, the present invention of the non-screwed fastening device 200 is applied to peripheral devices 300 inside the computer system. During the set-up process of peripheral devices 300, no auxiliary tools are needed to install and remove these peripheral devices 300 in and from the frame case. Besides having advantages in maintenance procedures, the non-screwed fastening device 200 can effectively reduce the use of screws with respect to peripheral devices 300 to avoid leaving screws within the frame case where they might cause a short circuit.

As understood by a person skilled in the art, the foregoing preferred embodiments of the present invention are illustrations rather than limitations of the present invention. It is intended to cover various modifications and similar arrangements included within the spirit and scope of the appended claims, the scope of which should be accorded the broadest interpretation so as to encompass all such modifications and similar structure.

What is claimed is:

1. A non-screwed fastening device, comprising:
    a retaining ring, cylindrical in shape, having a first annular edge, an inner ring flange and a second annular edge, wherein said first annular edge includes a plurality of slits dividing said retaining ring into a plurality of resilient portions to make said retaining ring resilient, said inner ring flange being disposed in a surface region of said retaining ring for buckling; and
    a shaft lever, being a column coupled to said retaining ring, having a first circular flute, a second circular flute, a first end portion and a second end portion, wherein said first circular flute located in a region of said shaft lever near said first end portion is buckled to said inner ring flange and said second circular flute located in a region of said shaft lever near said second end portion is selectively buckled to said inner ring flange.

2. The method of claim 1, wherein said first annular edge further comprises a bevel for readily placing said shaft lever into said retaining ring.

3. The method of claim 1, wherein an inner surface of said retaining ring along an axis line comprises at least a groove.

4. The method of claim 1, wherein said first end portion is a shape selected from the group consisting of a circle, a rectangular and the like shape.

5. The method of claim 1, wherein said second end portion further comprises a flange to handle said shaft lever.

6. The method of claim 3, wherein said retaining ring further comprises a recess region near said second annular edge.

7. The method of claim 6, wherein a side region of said shaft lever further comprises at least a lug to be placed into said retaining ring along said groove by turning said shaft lever so that said lug is locked to said recess region.

8. A non-screwed fastening device, comprising:
    a retaining ring, cylindrical in shape, having a first annular edge, an inner ring flange and a second annular edge, wherein said first annular edge includes a plurality of slits dividing said retaining ring into a plurality of resilient portions to make said retaining ring resilient, and at least a groove coupled to one of said slits is located in an inner surface of said retaining ring along an axial line thereof, said inner ring flange being disposed in a surface region of said retaining ring for buckling, said second annular edge having a recess region; and
    a shaft lever, being a column coupled to said retaining ring, having a first circular flute, a second circular flute, a first end portion and a second end portion, wherein said first circular flute located in a region of said shaft lever near said first end portion is buckled to said inner ring flange and said second circular flute located in a region of said shaft lever near said second end portion is selectively buckled to said inner ring flange, a side region of said shaft lever having at least a lug to be placed into said retaining ring along said groove by turning said shaft lever so that said lug is locked to said recess region.

9. The method of claim 8, wherein said first annular edge further comprises a bevel for readily placing said shaft lever into said retaining ring.

10. The method of claim 8, wherein said first end portion is a shape selected from the group consisting of a circle, a rectangular and the like shape.

11. The method of claim 8, wherein said second end portion further comprises a flange to handle said shaft lever.

12. A non-screwed fastening device, applied in a computer system for loading and unloading at least a peripheral device from a frame case, comprising:
    a retaining ring, cylindrical in shape, having a first annular edge, an inner ring flange and a second annular edge, wherein said first annular edge includes a plurality of slits dividing said retaining ring into a plurality of resilient portions to retain resilience in said retaining ring and at least a groove coupled to one of said slits is located in the inner surface of said retaining ring along a axial line thereof, said inner ring flange being disposed in a surface region of said retaining ring for buckling; and a shaft lever, being a column coupled to said retaining ring, having a first circular flute, a second circular flute, a first end portion and a second end portion, wherein said first circular flute located in a region of said shaft lever near said first end portion is buckled to said inner ring flange and said second circular flute located in a region of said shaft lever near said second end portion is selectively buckled to said inner ring flange.

13. The method of claim 12, wherein said peripheral device is used in a personal computer (PC) or a computer server.

14. The method of claim 12, wherein a resilience device is coupled to said frame case to eliminate a gap between said peripheral device and said frame case.

15. The method of claim 12, wherein said first annular edge further comprises a bevel for readily placing said shaft lever into said retaining ring.

16. The method of claim 12, wherein said retaining ring further comprises a recess region near said second annular edge.

17. The method of claim 12, wherein said first end portion is a shape selected from the group consisting of a circle, a rectangular and the like shape.

18. The method of claim 12, wherein said second end portion further comprises a flange to handle said shaft lever.

19. The method of claim 13, wherein said peripheral device is selected the group consisting of a floppy disk drive (FDD), a compact disc read only memory (CD-ROM), a digital versatile disc (DVD) and a hard disk drive (HDD).

20. The method of claim 16, wherein a side region of said shaft lever further comprises at least a lug to be placed into said retaining ring along said groove by turning said shaft lever so that said lug is locked to said recess region.

* * * * *